(12) United States Patent
Kim et al.

(10) Patent No.: US 7,853,694 B2
(45) Date of Patent: Dec. 14, 2010

(54) SYSTEM AND METHOD FOR PROVIDING CONTENTS SERVICE USING SERVICE RELAYING APPARATUS

(75) Inventors: Rock Won Kim, Daejeon (KR); Yeon Jun Kim, Daejeon (KR); Hyun Kim, Daejeon (KR); Young Jo Cho, Gyunggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 255 days.

(21) Appl. No.: 11/924,767

(22) Filed: Oct. 26, 2007

(65) Prior Publication Data

US 2008/0140809 A1 Jun. 12, 2008

(30) Foreign Application Priority Data

Dec. 7, 2006 (KR) .................. 10-2006-0124037
Jun. 27, 2007 (KR) .................. 10-2007-0063874

(51) Int. Cl.
 *G06F 15/173* (2006.01)
(52) U.S. Cl. .............. 709/226; 709/203; 709/223; 709/224; 340/825; 710/36
(58) Field of Classification Search ............. 709/203, 709/226, 223, 224; 710/36; 340/825
See application file for complete search history.

(56) References Cited

U.S. PATENT DOCUMENTS

| | | | |
|---|---|---|---|
| 7,231,421 B2 * | 6/2007 | Kawakura et al. ........... 709/203 |
| 7,401,143 B2 * | 7/2008 | Oulu et al. .................. 709/224 |
| 7,430,607 B2 * | 9/2008 | Bolles et al. ................ 709/229 |
| 7,480,724 B2 * | 1/2009 | Zimler et al. ............... 709/229 |
| 7,523,231 B1 * | 4/2009 | Gupta et al. .................. 710/36 |
| 7,558,854 B2 * | 7/2009 | Nakahara et al. ............ 709/226 |
| 7,774,495 B2 * | 8/2010 | Pabla et al. ................. 709/238 |
| 2002/0111967 A1 * | 8/2002 | Nagase ...................... 707/513 |
| 2003/0208563 A1 * | 11/2003 | Acree et al. ................. 709/219 |
| 2004/0202206 A1 * | 10/2004 | Lee ........................... 370/908 |
| 2007/0214214 A1 * | 9/2007 | Kawakura et al. ........... 709/203 |
| 2007/0294338 A1 * | 12/2007 | Nishizawa et al. .......... 709/203 |

FOREIGN PATENT DOCUMENTS

| | | |
|---|---|---|
| KR | 1020050060242 A | 6/2005 |
| KR | 1020050063886 A | 6/2005 |
| WO | WO03/047203 | 6/2003 |

* cited by examiner

*Primary Examiner*—Thu Ha T Nguyen
(74) *Attorney, Agent, or Firm*—Ladas & Parry LLP

(57) ABSTRACT

Provided are a system and method for providing contents service. A service storing apparatus stores service providing information and service request information. A service requesting apparatus composes a service search inquiry according to a contents service request, receives the inquiry result, and calls a corresponding service based on the received result to provide a corresponding contents service. A service relaying apparatus searches related service providing information from the service storing apparatus to provide information necessary for calling the service when the service search inquiry is received. A service providing apparatus provides service proxy information of a content service and provides a corresponding contents service when a service is called by a service requesting apparatus.

16 Claims, 8 Drawing Sheets

SERVICE PROVIDING INFORMATION TABLE(500)

| SERVICE PROVIDER (510) | SERVICE TARGET (520) | SERVICE CATEGORY (530) | SERVICE KEYWORD (540) | SERVICE PROTOCOL (550) | SERVICE INTERFACE LOCATION (560) | DESCRIPTION (570) |
|---|---|---|---|---|---|---|
| Sp-100 | public | WEATHER/ | DAEJON, LAUNDRY INDEX | WSDL | http://provider.com/test.wadl | WEATHER SERVICE |
| Sp-101 | public | NEWS/ | POLITIC, ECONOMY, SPORTS | RMI | http://provider.com/news.java | HEAD LINE NEWS SERVICE |
| Sp-102 | public | COOK/ CHINESE | NOODLE, SWEET AND SOUR CHICKEN | CORBA | http://provider.com/food.idl | RECIPE PROVIDING SERVICE |
| Sp-103 | Sr-100 | BOOK/FAIRY TALE/AESOP | FOX AND CROW | PLANET | http://provider.com/story.java | AESOP'S TALE ANIMATION SERVICE |
|  |  |  |  |  |  |  |

FIG. 3

SERVICE REQUEST INFORMATION TABLE(600)

| SERVICE USER (610) | SERVICE CATEGORY (620) | SERVICE KEYWORD (630) | SERVICE TIME LIMIT (640) | USER CONTACT E-MAIL (650) | REQUEST TARGET (660) | DESCRIPTION (670) |
|---|---|---|---|---|---|---|
| Sr-100 | TRAVEL/DIARY | HOKKAIDO, SKI, SCHEDULE, COST | 2007-2-31 | rwkim@etri.re.kr | Public | REQUEST INFORMATION FOR SKI TRAVEL OF HOKKAIDO |
| Sr-101 | NEWS | CHAN-HO PARK | 2006-10-32 | test@etri.re.kr | Public | NEWS INFORMATION RELATED TO CHAN-HO PARK |
| Sr-102 | SERVICE/ BABY SITTING | BABY/SITTER/COST | 2006-11-10 | jskek@hanmail.net | Sp-100,Sp-202 | COST FOR BABY SITTER FOR TWO MONTHS |
| | | | | | | |
| | | | | | | |

FIG. 4

INTEREST REQUEST LIST TABLE (700)

| SERVICE PROVIDER (710) | SERVICE CATEGORY (720) | SERVICE KEYWORD (730) | AUTO-DELETION TIME LIMIT (740) |
|---|---|---|---|
| Sp-100 | TRAVEL/JAPAN | TOKYO | 2007-2-31 |
| Sp-101 | NEWS/ | ENGLAND, SOCCER LEAGUE | 2006-10-32 |
| Sp-102 | SERVICE/ BABY SITTER | DAY CARE CENTER | 2006-11-10 |
|  |  |  |  |
|  |  |  |  |

FIG. 5

SYSTEM AND METHOD FOR PROVIDING CONTENTS SERVICE USING SERVICE RELAYING APPARATUS

CROSS-REFERENCE TO RELATED APPLICATIONS

This application claims the priority of Korean Patent Application No. 10-2006-124037, filed on Dec. 7, 2006, and the priority of Korean Patent Application NO. 10-2007-63874, filed on June 27 in the Korean Intellectual Property Office, the disclosure of which is incorporated herein by reference.

BACKGROUND OF THE INVENTION

1. Field of the Invention

The present invention relates to a system and method for providing contents service, and more particularly, to a system and method for providing contents service in order to provide predetermined content information to a user in a service unit such as a function call of a program or a web-service call.

This work was supported by the IT R&D program of MIC/IITA. [2006-S-026-01, "Development of the URC server framework for proactive robotic service"]

2. Description of the Related Art

A web page (World Wide Web), which is provided through the Internet, contains a large amount of information. The web page functions as a space for sharing the huge amount of information which is dynamically created and removed.

Currently, several billion web pages exist on the Internet. In order to obtain desired information through such web pages, a user generally uses Internet search sites such as google, yahoo, or naver.

In a conventional method for searching information using such Internet search site, a user inputs a key word for related to target information into a search window of the Internet search site. Accordingly, a server, which manages the Internet search site, searches information related to the inputted key word, and provides the search result to a user. The user checks the search result provided from the server. Then, the user searches target information again or selects one of the results provided from the server. Such a conventional information obtaining method may return information not closely related to the target information or return too many results. Therefore, a user may waste a lot of time to repeatedly search the target information or to select one of the search results, which is the closest to the target information.

In the conventional information obtaining method, the link information of contents related to the inputted keyword is provided to a user as the search result. Then, a user must perform annoying processes such as directly accessing corresponding links, reading a Hyper Text Markup Language (HTML) document, and determining the accuracy of the HTML documents. Therefore, it is difficult to apply the conventional information obtaining method into a terminal that has difficulty to confirm information through the above described method. For example, a terminal such as a personal digital assistant (PDA) or a mobile phone has a limited display area which is smaller than a display for a personal computer. A robot may have an interface for interacting with a user through only voice. Therefore, the conventional information obtaining method cannot be applied thereto.

Also, there was no method introduced for registering information (web page), which is provided to a user, to a search engine. A contents provider may provide only accessing information for accessing a contents (web page) to a user by registering it to an Internet search site like advertisement with a predetermined cost charged to the user. Such a method has a structural problem that the exclusive right of information is given to an internet search service provider.

Since the conventional method does not automatically inform a user that target information is available at a moment of the target information provided by someone, a user must repetitiously access an Internet search site and search the target information until the user obtains the target information.

SUMMARY OF THE INVENTION

An aspect of the present invention provides a system and method for providing contents service to enable a contents service provider and a user to accurately search and register contents information.

Another aspect of the present invention also provides a system and method for easily providing contents services through a service call between a service provider and a user, which are connected through peer to peer (P2P).

Still another aspect of the present invention also provides a system and method for providing contents services, which enable a corresponding service user to receive predetermined contents from a latent service provider.

According to an aspect of the present invention, there is provided a contents service providing system including: a service storing apparatus, a service requesting apparatus, a service relaying apparatus, and a service providing apparatus. The service storing apparatus stores service providing information related to available services and service request information from a user. The service requesting apparatus composes a service search inquiry according to a contents service request inputted by a user, receives result information of the service inquiry request, calls a corresponding service based on the received result information, receives a corresponding contents service as the calling result, and provides the received contents service to a user. The service relaying apparatus searches related service providing information from the service storing apparatus and provides information necessary for calling the service when the service search inquiry is received from the service requesting apparatus. The service providing apparatus provides service proxy information to provide a service corresponding to service providing information stored in the service storing apparatus and provides a corresponding contents service when a service is called by a service requesting apparatus that receives the proxy information.

According to another aspect of the present invention, there is provided a contents service providing method in a service requesting apparatus receiving a service from a service providing apparatus through a service relaying apparatus, comprising: composing a service search inquiry by receiving a category and a search keyword for a contents service that a user wants to receive; transmitting the composed service search inquiry to the service relaying apparatus and waiting to receive a search result; obtaining proxy of a corresponding service from the service relaying apparatus with reference to service providing information included in the search result if the search result is received from the service relaying apparatus; calling a service to a corresponding service providing apparatus using the obtained service proxy; and providing a contents service provided from the service providing apparatus by the service call to a user.

According to still another aspect of the present invention, there is provided a contents service providing method in a service relaying apparatus for relaying services between a service requesting apparatus and a service providing apparatus, comprising: receiving and storing service providing information having service proxy information for a contents service from a service providing apparatus; receiving a service search inquiry for a contents service that a user wants to receive from the service requesting apparatus; searching service providing information in response to the service search inquiry using a category and a keyword included in the service search inquiry; and providing service proxy necessary for corresponding service providing information and service call to a service requesting apparatus if the service providing information is searched corresponding to the search result.

According to further still another aspect of the present invention, there is provided a contents service providing method in a service providing apparatus for providing a contents service to a service requesting apparatus through a service relaying apparatus, comprising: providing and registering an interest request list, which is a list of service requests interested by a service provider, to the service relaying apparatus; receiving service request information of a user from the service relaying apparatus, obtaining corresponding service request information by comparing an interest request list registered at the service relaying apparatus and service request information, or receiving service information from a service provider; generating a source code of a corresponding contents service based on the service request information and the service information, and transmitting and registering service providing information of a generated contents service and a service proxy to the service relaying apparatus; calling and receiving contents service from a service requesting apparatus that obtains a service proxy registered at the service relaying apparatus; and providing a corresponding contents service to the service requesting apparatus that calls the service.

BRIEF DESCRIPTION OF THE DRAWINGS

The above and other aspects, features and other advantages of the present invention will be more clearly understood from the following detailed description taken in conjunction with the accompanying drawings, in which:

FIG. 3 is a table of information about providing contents service according to an embodiment of the present invention;

FIG. 4 is a table of information about requesting contents service according to an embodiment of the present invention;

FIG. 5 is a table of information about interest contents request list according to an embodiment of the present invention;

DETAILED DESCRIPTION OF THE PREFERRED EMBODIMENT

Figure 1:
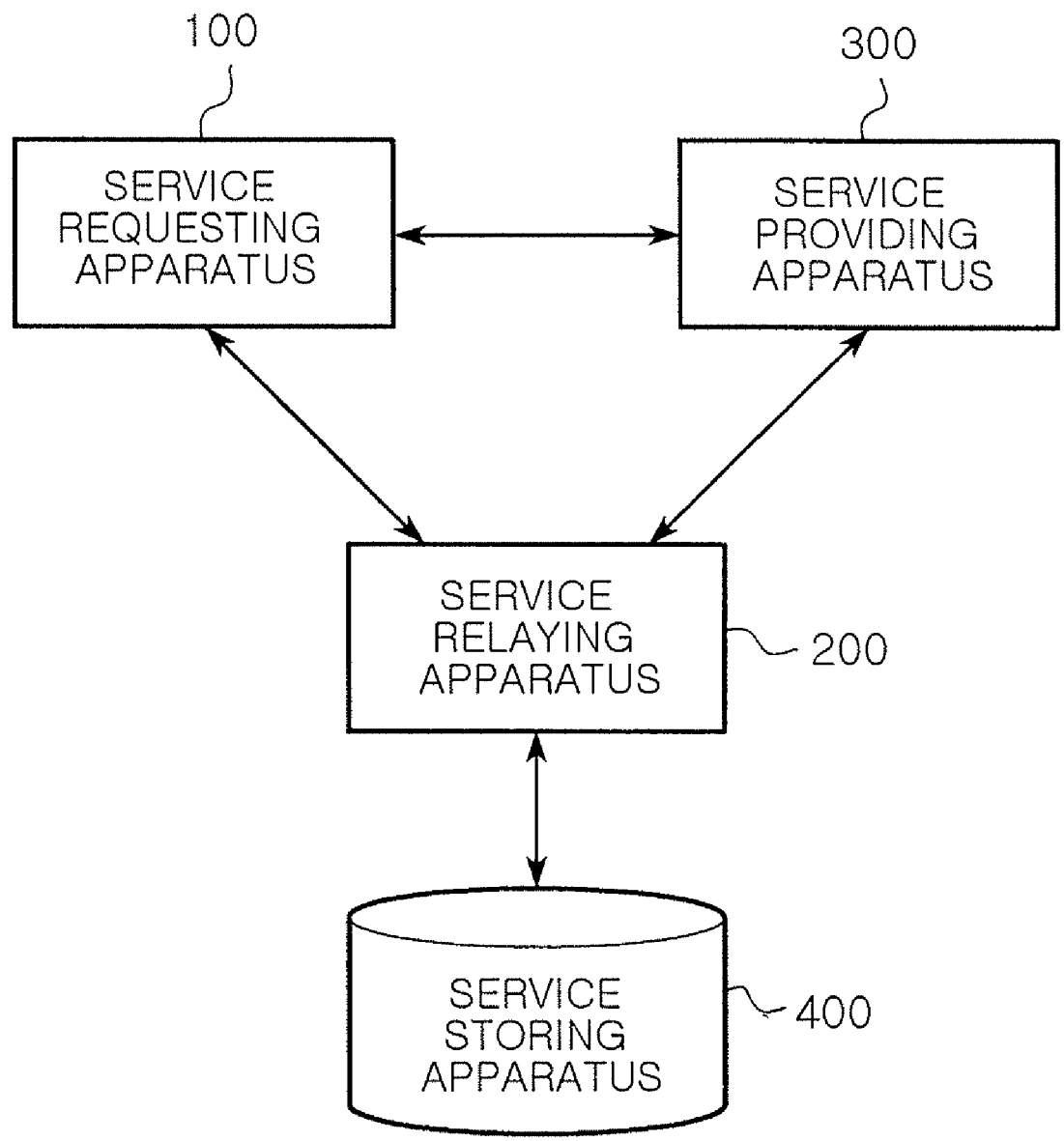
FIG. 1 is a block diagram illustrating a system for providing contents service using a service relaying apparatus according to an embodiment of the present invention.

Exemplary embodiments of the present invention will now be described in detail with reference to the accompanying drawings. Throughout the accompanying drawings, like reference numerals denote like elements. The detailed description of well-known functions and elements will be omitted.

FIG. 1 is a block diagram illustrating a system for providing contents service using a service relaying apparatus according to an embodiment of the present invention.

As shown in FIG. 1, the contents service providing system according to the present embodiment includes a service requesting apparatus 100, a service relaying apparatus 200, a service providing apparatus 300, and a service storing apparatus 400.

The service requesting apparatus 100 receives a search category and a search keyword to search target contents from a user, and receives information about a service provider that provides the contents by inquiring a service search process to the service relaying apparatus 200. Then, the service requesting apparatus 100 calls a service to the service providing apparatus 300 of the service provider and provides contents from the service providing apparatus 300 to a user. Also, the service requesting apparatus 100 registers a corresponding service request to the service relaying apparatus 200 if the result of inquiring the service search is not provided. Then, the service requesting apparatus 100 receives information about a service provider in later if a service provider provides a service for the contents.

The service relaying apparatus 200 searches service provider information corresponding to a keyword from the service storing apparatus 400 according to the service search inquiry including a category and a keyword related to the target contents from the service requesting apparatus 100 and provides the search result to the service requesting apparatus. The service provider information is information about a function call or a web service call of a program that is necessary to request the searched service provider to provide the target contents service. Also, the service relaying apparatus 200 registers the service requesting information of the service requesting apparatus 100 to be provided corresponding service by discretionary service provider in later.

The service providing apparatus 300 services contents that a service provider wants to provide to a user. The service providing apparatus 300 generates information about contents services provided to a user and creates a proxy for allowing the access of the generated contents service. The service providing apparatus 300 provides information about the generated contents service and the created proxy to the service relaying apparatus 200. The service relaying apparatus 200 stores the received information in the service storing apparatus 400.

The service storing apparatus 400 stores information related to contents services available to be provided by the service providing apparatus 300 and a list of contents services requested by users.

Figure 2:
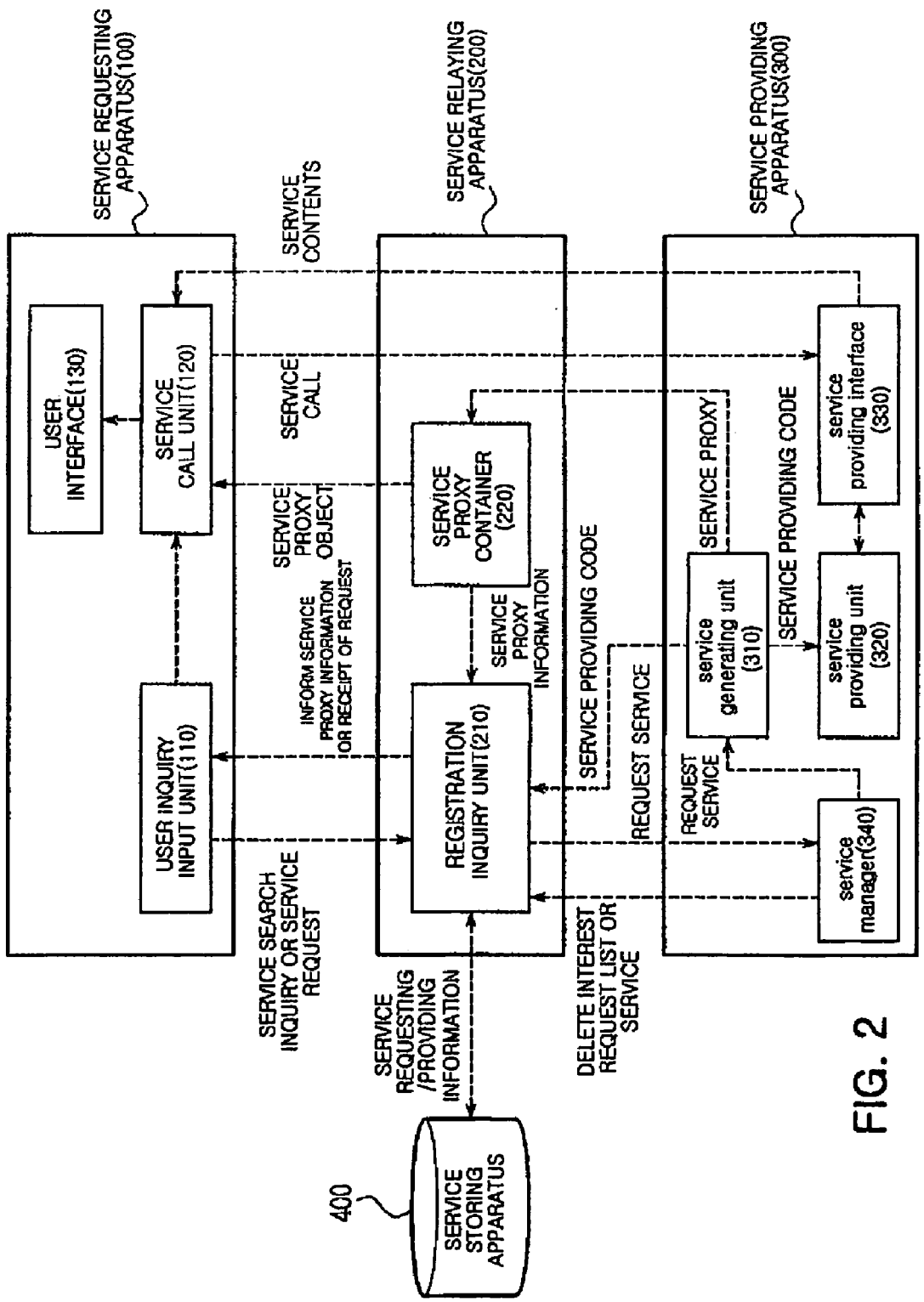
FIG. 2 is a detailed diagram illustrating a system for providing contents service using a service relaying apparatus according to an embodiment of the present invention.

FIG. 2 is a detailed diagram illustrating a system for providing contents service using a service relaying apparatus according to an embodiment of the present invention. The detailed configurations and operations of the system for providing contents service according to the present embodiment will be described in detail with reference FIG. 2.

Referring to FIG. 2, the service requesting apparatus 100 includes a user inquiry input unit 110, a service call unit 120, and a user interface 130.

The service relaying apparatus 200 includes a registration inquiry unit 210 and a service proxy container 220.

The service providing apparatus 300 includes a service generating unit 310, a service providing unit 320, a service providing interface 330, and a service managing unit 340.

The user inquiry input unit 110 of the service requesting apparatus 100 receives a search keyword and a category for finding a target contents service from a user, generates a service search inquiry for finding the information about a service provider that can service the target contents, and transmits the generated service search inquiry to the service relaying apparatus 200, thereby inquiring the information of the contents service. The user inquiry input unit 110 receives the inquiry result from the service relaying apparatus 200 and provides the service proxy information for servicing corresponding contents, which is included in the received inquiry result, to the service call unit 120.

The service call unit 120 obtains a service proxy object from the service relaying apparatus 200 using the service proxy information extracted from the inquiry result. Then, the service call unit 120 calls corresponding contents service of the service providing apparatus 300 using the service proxy object.

The user interface 130 receives the result of calling the target contents service from the service providing apparatus 300 and transfers the receive result to a user.

In more detail, the user interface 130 executes a program that can process a return value of the called contents service, and the contents service is provided to a user by the executed program. The user interface 130 can call the other services included in the service proxy using the service call unit 120.

Meanwhile, the user inquiry input unit 110 checks the inquiry result received from the service relaying apparatus 200. If a corresponding contents service is not present, the user inquiry input unit 110 receives property values from a user for registering a service request. The property values are entry property values of a service request information table of FIG. 4, which is managed by the service relaying apparatus 300 and stored in the service storing apparatus 400. It will be described in more detail in later.

The user inquiry input unit 110 generates a contents service request message having the received property values for registering a service request and transfers the generated contents service request message to the service relaying apparatus 200, thereby requesting the registration of a service request for the target contents. The service request is a request for automatically providing corresponding service provider information if the contents service will be provided in later.

When it starts to provide a corresponding content service after the service request is registered, the service provider information including service proxy information is provided from the service relaying apparatus 200. Then, the service provider information is processed identically to the processing of the service search inquiry result.

The registration inquiry unit 210 of the service relaying apparatus 200 receives a service search inquiry having a search keyword and a search category from the user inquiry input unit 110 of the service requesting apparatus 100. Using the search keyword and the search category, the registration inquiry unit 210 searches the service storing apparatus 400. As a result, the registration inquiry unit 210 obtains information about a service provider that provides a corresponding contents service. Also, the registration inquiry unit 210 obtains service proxy information from the service proxy container 220 and provides the obtained service proxy information to the user inquiry input unit 10. Furthermore, the registration inquiry unit 210 receives a service request registration request for contents transmitted from the user inquiry input unit 110, registers the received request in a service request information table of the service storing apparatus 400, and transmits a request acceptance message to the user inquiry input unit 110. When information about a service provider that provides a contents service corresponding to the service requests registered in the service request information table will be registered in later, the service providing information is provided to the user inquiry input unit 100 of the service requesting apparatus 100.

Then, the service proxy container 200 of the service relaying apparatus 200 stores a service proxy object for calling a contents service provided by the service providing apparatus, which is generated from the service providing apparatus 300, and provides the stored service proxy object to the registration inquiry unit 210. The service proxy container 200 also provides the service proxy object to the service call unit 120 of the service requesting apparatus 100.

The service generating unit 310 of the service providing apparatus 300 generates a source code for providing contents service. The service generating unit 310 generates service providing information of contents service generated the source code and a service proxy for calling the contents service, and transfers the service providing information service providing code to the registration inquiry unit 210 of the service relaying apparatus 200 to register the service providing information. Also, the service generating unit 310 provides the service proxy to the service proxy container 220 of the service relaying apparatus 200.

The service providing unit 320 manages the state that can provide contents services based on the source code generated by the service generating unit 310.

The service providing interface 330 provides corresponding service contents to the service call unit 120 through a standard call interface of the service providing unit 320 in response to a service call from the service call unit 120 of the service requesting apparatus 100.

The service managing unit 340 manages a service request from a user or a service request interested by a service provider. That is, the service managing unit 340 provides an interest request list, which is a list of service requests interested by a service provider, to the registration inquiry unit 210 of the service relaying apparatus 200, registers the interest request list, and adds or deletes request information to/from the registered interest request list. When a contents service is terminated, the service managing unit 340 deletes items related to the terminated contents service from the service providing information registered at the service relaying apparatus 200. The service managing unit 340 can provide the service providing list with the terminated service item deleted to the registration inquiry unit 210.

When a new service request is registered at the service relaying apparatus 200, the service managing unit 340 receives and stores the newly registered request information from the registration inquiry unit 210. When a service provider wants to provide a corresponding contents service, the service managing unit 340 transfers the stored service request list to the service generating unit 310. The service generating unit 310 generates a source code for providing a service based on the service request information, registers generated contents service providing information to the service relaying apparatus 200, provides a service proxy corresponding the source code to the service proxy container 220, and the source code to the service providing unit 320.

The service storing apparatus 400 stores information for providing contents service, which is managed by the service relaying apparatus 200. The service storing apparatus 400 includes a service providing information table for storing information about services that are currently provided by a service provider, a service request information table for storing information about services that a user wants to have, and an interest request list table for storing information about a service request of a user, which a service provider is interested to provide related services in later.

The service relaying apparatus 200 receives service providing information from the service providing apparatus 300, composes the service providing information table based on the received service providing information, and stores the service providing information table in the service storing apparatus 400. FIG. 3 is a table of information about providing contents service according to an embodiment of the present invention.

Referring to FIG. 3, the service providing information table 500 includes service provider information 510, service target information 520, service category information 530, service keyword information 540, service protocol information 550, service interface location information 560, and description information 570 for corresponding contents services as entries.

Among the information, the service provider information 510 denotes a service provider that provide a corresponding contents service and is identified by unique identification information of a corresponding service provider, which is provided from the service providing apparatus 300.

The service target information 520 is an item for the service providing apparatus 300 to assign a target to provide a corresponding contents service. If the target for a service is 'public', it means to open to all of users. If the service target information 520 includes an ID of a predetermined service user, it means to provide a predetermined service only to the predetermined service user.

The service category information 530 means high level classification information for contents services provided by the service providing apparatus 300. The service category information 530 is described based on a classification system for the categories of the contents services stored in the service storing apparatus 400.

The service keyword information 540 denotes a search keyword for a corresponding contents service related to the service citatory information 540. Such a keyword may be set by a service provider.

The service protocol information 550 denotes communication protocol used by the service providing apparatus 300 to provide a contents service, that is, to call a corresponding contents service.

The service interface location information 560 denotes location information where information about a method for calling a corresponding contents service is obtained from service providing apparatus 300.

The description information 570 is schematic description for helping a user to clearly understand a corresponding contents service.

Such information is provided from service providing apparatus 300 to the service relaying apparatus 200, and the service relaying apparatus 200 records such information in the service providing information table 500 in the service storing apparatus 400. Each entry of the service providing information table 500 is updated whenever new contents service is provided, and deleted when a corresponding contents service is terminated. Such a request for adding or deleting is transferred from the service providing apparatus 300.

The service request information table is composed in the service storing apparatus 400 based on corresponding information received from the service relaying apparatus 200.

FIG. 4 is a table of information about requesting contents service according to an embodiment of the present invention.

Referring to FIG. 4, the service request information table 600 includes service user information 610, service category information 620, service keyword information 630, service time limit information 640, user contact information e-mail 650, request target information 560, and description information 670 for corresponding service request.

Among the information, the service user information 610 is information about a user who requests a corresponding service, which is unique identification information assigned according to the service requesting apparatus 100. The service category information 620 denotes a high level classification for the request contents service. It refers a classification system for the categories of contents service. The service keyword information 630 is a detail search keyword for searching a requested service related to the service category information 620. Such a search keyword is set by a service user. The service time limit information 640 is information about a limit time for a corresponding service request. The service time limit information 640 is set by receiving input from a user through the user inquiry input unit 110 at the service requesting apparatus 100. The user contact information 650 is the contact information of a user, which is used for transferring a notice for a corresponding service request from a service providing apparatus to a service user. The user contact information 650 may be address information such as E-mail address. The request target information 660 is information for assigning a service provider to show the corresponding service request information. The request target information 660 is received from a user through the user inquiry input unit 110 of the service requesting apparatus 100. For example, if the request target information 660 is 'Public', it means that the service request information can be opened to any service provider. If the request target information 660 includes the identification information of a predetermined service provider, the corresponding service request information is opened only to the predetermined service provider. Finally, the description information 670 is schematic description for helping a service provider to clearly understand registered service request information.

The interest request list table 700 is composed by the service relaying apparatus 200 according to a request from the service providing apparatus 300 and is stored in the service storing apparatus 400. That is, the interest request list table 700 stores a list of service requests that the service providing apparatus 300 wants to receive. FIG. 5 is a table of information about interest contents request list according to an embodiment of the present invention.

Referring to FIG. 5, the service request list information table 700 includes service provider information 710, service category information 720, service keyword information 730, and auto-deletion time limit information 740 for a corresponding interest request list.

The service provider information 710 is information for assigning a service provider who provides a corresponding interest request. The service provider information 710 is recognized as unique identification information assigned for the service providing apparatus 300. The service category information 720 denotes a high level classification of a corresponding interest request assigned by the service provider. It refers a classification system for categories of services. The service keyword information 730 denotes a detail search keyword for a corresponding service related to the service category information 720. Such a search keyword is composed by a service provider. The auto-deletion time limit information 740 is information about a time for automatically deleting corresponding interest information registered by a service provider.

Hereinafter, a method for providing contents service according to an embodiment of the present invention will be described in detail.

The method for providing contents service using a service relaying apparatus according to the present embodiment includes a procedure of requesting contents service, a procedure of relaying contents services, and a procedure of providing contents service.

Figure 6:
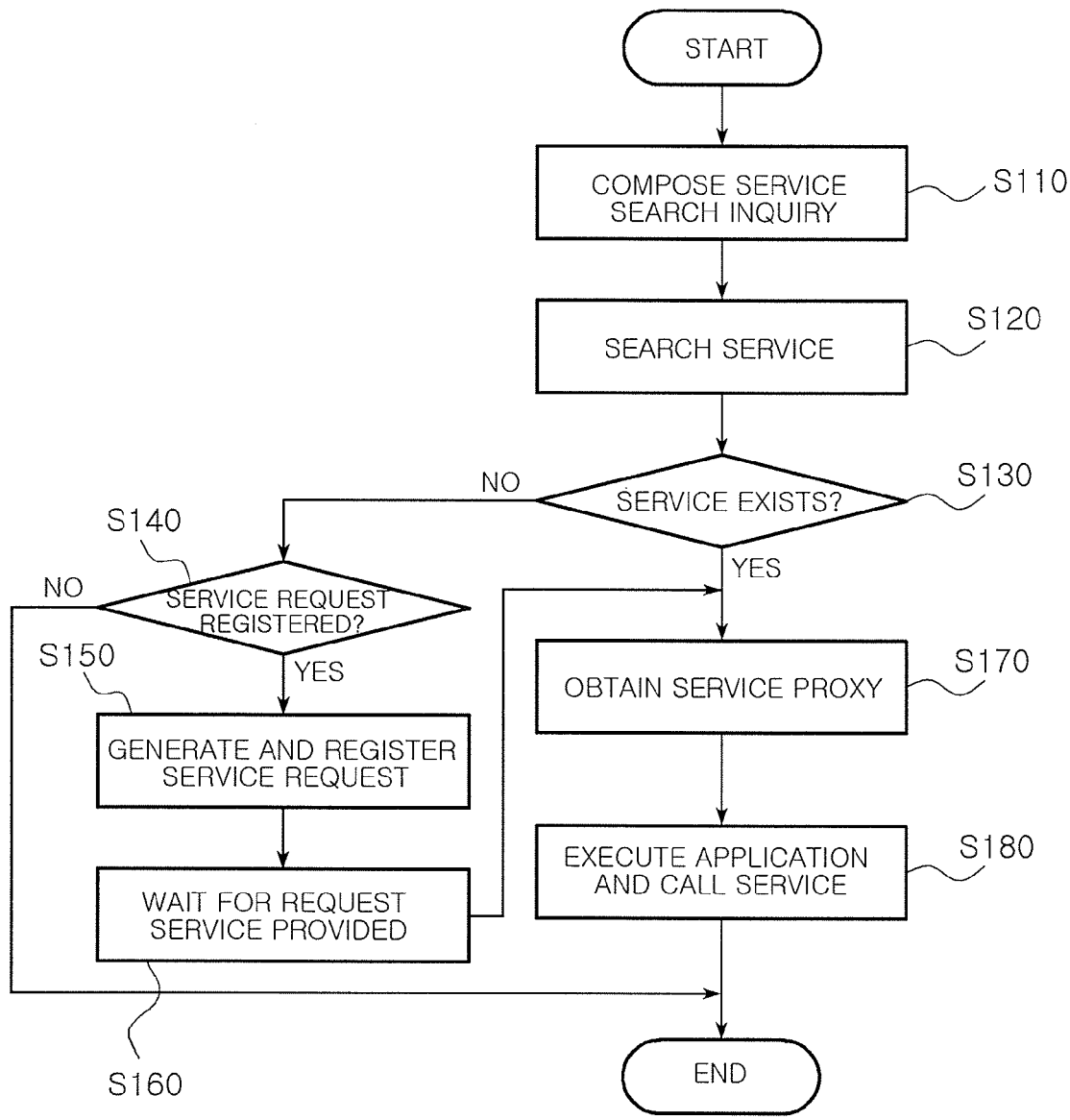
FIG. 6 is a flowchart illustrating a procedure of requesting contents service in a contents service providing system using a service relaying apparatus according to an embodiment of the present invention.

FIG. 6 is a flowchart illustrating a procedure of requesting contents service in a contents service providing system using a service relaying apparatus according to an embodiment of the present invention.

Referring to FIG. 6, when a user wants to receive a contents service, the user inquiry input unit 110 of the service requesting apparatus 100 composes a service search inquiry and transmits the service search inquiry to the registration inquiry unit 210 of the service relaying apparatus 200. A service classification category is obtained from the service storing apparatus through the service relaying apparatus 200 and is provided to a user. Then, the user selects a service category and inputs a keyword for search. The service search inquiry document is composed to include the service category and the search keyword, which are selected and received from the user.

The registration inquiry unit 210 of the service relaying apparatus 200 searches service providing information from the service storing apparatus 400 based on the selected service category and the input search keyword and transfers the search result to the user inquiry input unit 110 of the service requesting apparatus 100.

In operations S120 and S130, the user inquiry input unit 110 of the service requesting apparatus 100 receives the service search result from the registration inquiry unit 210 of the service relaying apparatus 200 in response to the service search request and determines whether the received search result include target service providing information or not.

If the target service providing information is in the received search result in the operation S130, the user inquiry input unit 110 of the service requesting apparatus 100 obtains service proxy information from the registration inquiry unit 210 of the service relaying apparatus 200 in operation S170. The user inquiry input unit 110 of the service requesting apparatus 100 provides the obtained service proxy information to the service call unit 120, and the service call unit 120 obtains service proxy object information stored in the service proxy container 220 of the service relaying apparatus 200 based on the obtained service proxy information.

In operation S180, the service call unit 120 calls a corresponding contents service from the service providing apparatus 300 using the obtained service proxy object information. When a corresponding contents service is provided from the service providing apparatus 300, the user interface 130 executes an application program and provides the provided contents service to a user.

If the target service providing information is not in the received search result in the operation S130, the user inquiry input unit 110 determines whether a service request registration for contents is received from a user or not in operation S140. If it is determined that a service request registration for contents is not received from a user, the user inquiry input unit 110 terminates the contents service request procedure.

On the contrary, if it is determined that a service registration request for contents is received from a user in operation S140, the user inquiry input unit 110 receives property values defined in the service request information table 600 stored in the service storing apparatus 400 from a user, provides the received property values to the registration inquiry unit 210, and registers the provided property values in the service request information table 600 in the service storing apparatus 400 in operation S150.

In operation S160, the user inquiry input unit 110 waits to receive service proxy information that informs that a service corresponding to the registered service request is provided from the registration inquiry unit 210 as background operation.

When the service proxy information is inputted, the user inquiry input unit 110 of the service requesting apparatus 100 obtains service proxy information provided from the registration inquiry unit 210 of the service relaying apparatus 200. Accordingly, operation S170 is performed. That is, the service call unit 120 calls the request of a corresponding contents service include in the obtained service proxy object information to the service providing apparatus 300. When the service providing apparatus 300 provides the content service, an application program is executed through the user interface 130, thereby providing the provided contents service to a user in operation S180.

A user can search and call a target contents service through the service request procedure. In addition, if the target contents service is not present, a user can receive information that a corresponding contents service is provided by registering the related service request through the service request procedure.

Figure 7:
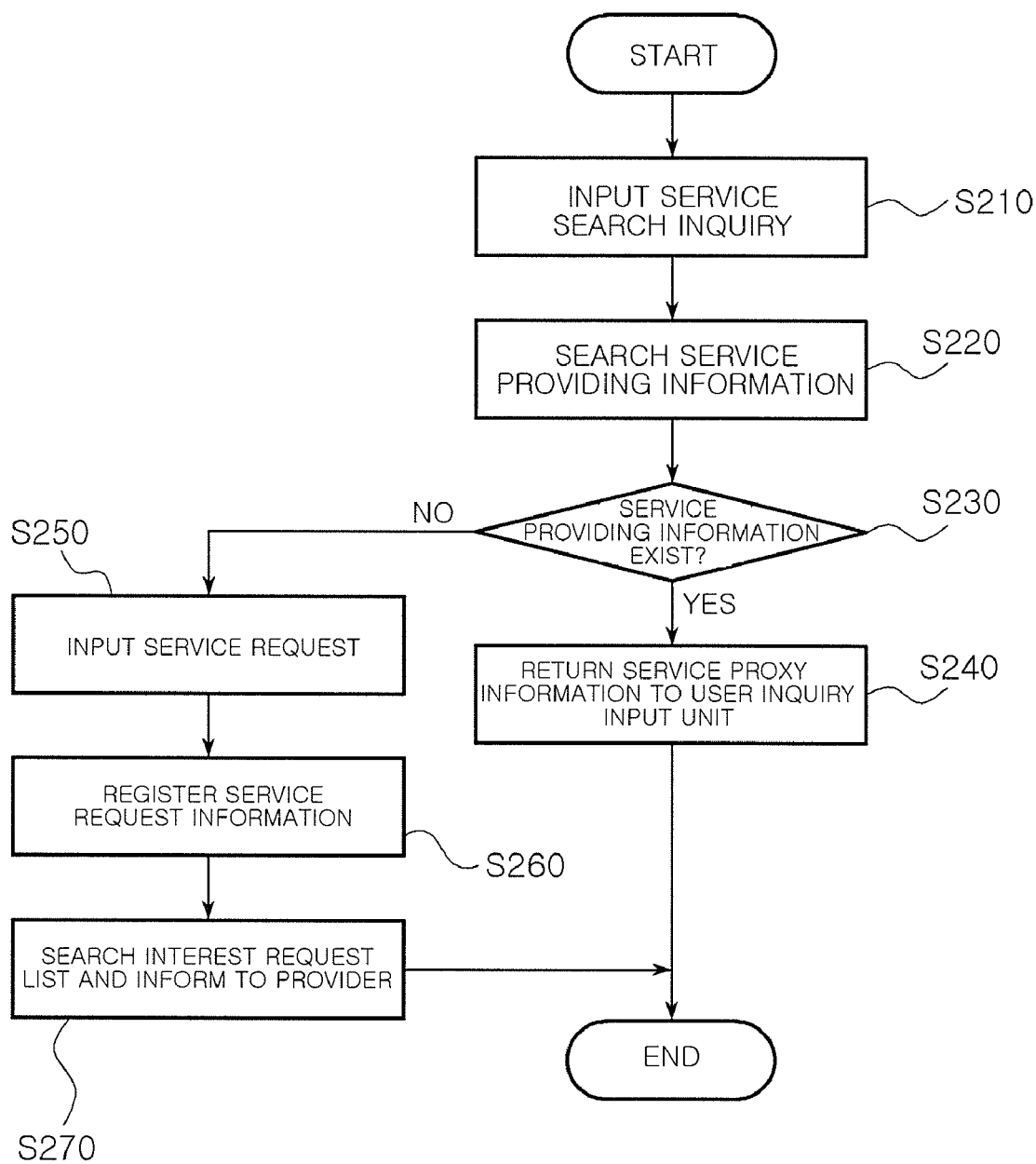
FIG. 7 is a flowchart a procedure of relaying contents service in a contents service providing system using a service relaying apparatus according to an embodiment of the present invention.

FIG. 7 is a flowchart a procedure of relaying contents service in a contents service providing system using a service relaying apparatus according to an embodiment of the present invention. In the service relaying procedure, the service relaying apparatus 200 relays services between the service requesting apparatus 100 and the service providing apparatus 300.

Referring to FIG. 7, when the registration inquiry unit 210 of the service relaying apparatus 200 receives a service search inquiry from the user inquiry input unit 110 of the service requesting apparatus 100 in operation S210, the registration inquiry unit 210 searches corresponding service providing information from the service providing information table 500 in the service storing apparatus 400 in operation S220.

It is determined whether the service providing information corresponding to the inquiry is included in the search result or not in operation S230.

If it is determined that the service providing information corresponding to the inquiry is included in the search result in operation S230, the registration inquiry unit 210 returns service proxy information included in the searched service providing information to the user inquiry input unit 110 in operation S240.

On the contrary, if it is determined that the service providing information corresponding to the inquiry is not included in the search result S230, the registration inquiry unit 210 waits for receiving the service request information from the user inquiry input unit 110 in operation S250.

When the service request information is transferred from the user inquiry input unit 110 by a user request, the registration inquiry unit 210 registers the transferred service request information to the service request information table 600 in the service storing apparatus 400 in operation S260.

Then, the registration inquiry unit 210 searches the interest request list table 700 stored in the service storing apparatus 400 using a service category 620 and a service keyword 630 of the registered service request information in the service request information table 600 and transfers the service request information to the service managing unit 340 of the service providing apparatus 300 that registers an interest request that matches with the service category and having the intersection of the service keyword in operation S270.

The service relaying apparatus 200 can smoothly relay contents service between a service user and a service provider through the service relaying procedure. Particularly, the service relaying apparatus 200 can provide service request information that a user wants to a service provider through the service relaying procedure.

Figure 8:
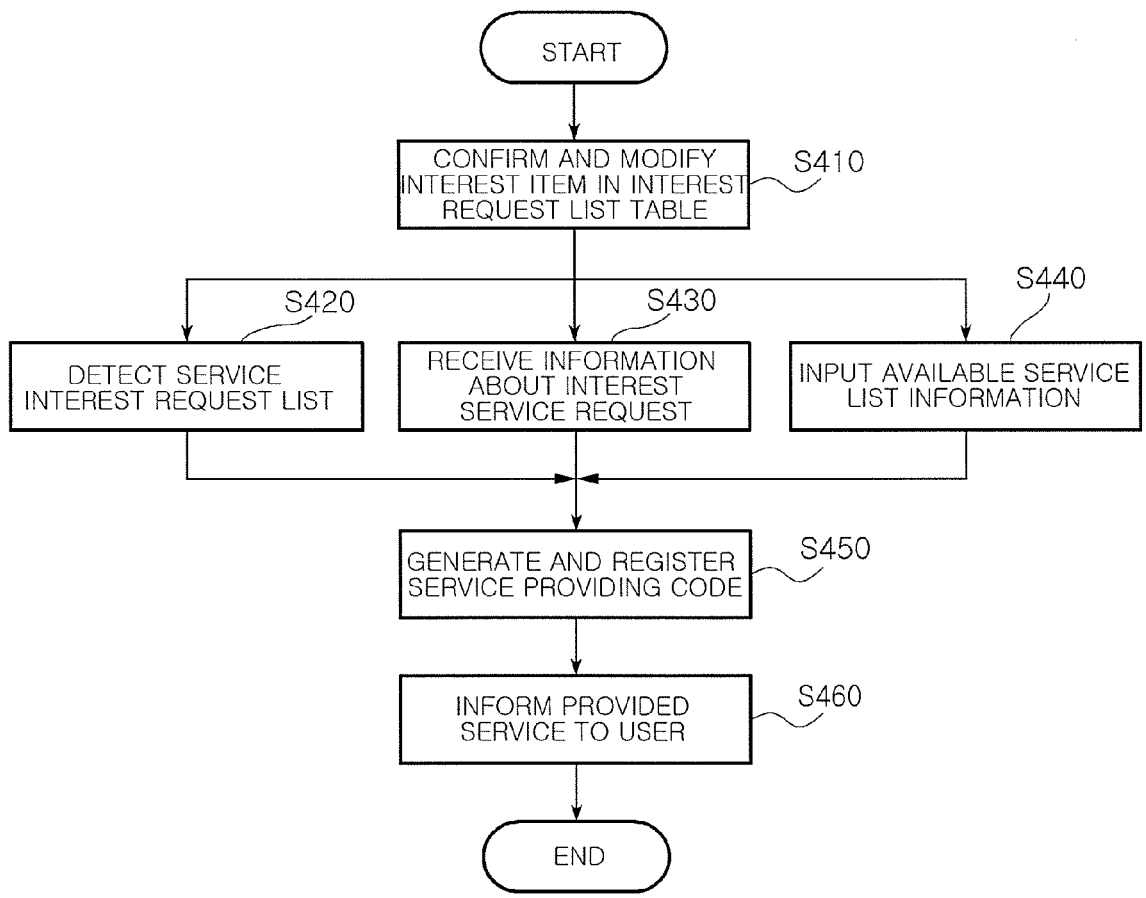
FIG. 8 is a flowchart illustrating a procedure of providing contents service in a contents service providing system using a service relaying apparatus according to an embodiment of the present invention.

FIG. 8 is a flowchart illustrating a procedure of providing contents service in a contents service providing system using a service relaying apparatus according to an embodiment of the present invention. The service providing apparatus 300 performs the contents service providing procedure.

Referring to FIG. 8, the service managing unit 340 of the service providing apparatus 300 searches interest request information registered at the interest request list table 700 through the service relaying apparatus 200. Then, the service managing unit 340 adds new interest request information, deletes unnecessary interest request information, or modifies the existing interest request information by confirming the search interest request information in operation S410.

Then, the service managing unit 340 compares the interest request list table 700 stored in the service storing apparatus 400 with the service request information table 600 and detects service requests matched with information in the interest request list table from the service request information table in operation S420. Then, the service managing unit 340 receives newly registered service request information from the registration inquiry unit 210 of the service relaying apparatus 200 in operation S430, or receives a service providing list from a service provider in operation S440.

If one of the operations S420, S430, and S440 is performed, the service generating unit 310 of the service providing apparatus 300 generate a service providing code according to the searched or inputted service request or the composed service providing information, and registers information about the generated service providing code to the service storing apparatus 400 through the registration inquiry unit 210 in operation S440.

Then, the service managing unit 340 transfers the service proxy information included in the registered service providing code information to the user inquiry input unit 110 of the service requesting apparatus 100, which wants to automatically receive corresponding contents service through the registration manager 210 in operation S450.

The service provider obtains service information that a user wants to have and the service provider wants to provide and can provide proper services based on the obtained service information through the service providing procedure. In addition, the service provider can provide the generated service providing information and the service proxy information to the service requesting apparatus 100 of a user through the service relaying apparatus 200.

While the present invention has been shown and described in connection with the exemplary embodiments, it will be apparent to those skilled in the art that modifications and variations can be made without departing from the spirit and scope of the invention as defined by the appended claims.

As described above, the system and method for providing contents service according to an embodiment of the present invention manages information for requesting a contents service to provide and information about available services using the service relaying apparatus. Therefore, intelligent agents are enabled to accurately search target information and to perform related processes because it is possible to abstract information in a service unit between an information provider and a user.

Also, the system and method for providing contents service according to an embodiment of the present invention conveniently connects an information provider and an information user using a service relaying apparatus. Therefore, the system and method for providing contents service according to an embodiment of the present invention can provide a technology to overcome the limitation of a current web technology by providing a technical foundation to widely use a push technology for a service.

What is claimed is:

1. A contents service providing system comprising:
a service storing apparatus for storing service providing information related to available services and service request information from a user;
a service requesting apparatus for composing a service search inquiry according to a contents service request inputted by a user, receiving result information of the service inquiry request, calling a corresponding service based on the received result information, receiving a corresponding contents service as the calling result, and providing the received contents service to a user;
a service relaying apparatus for searching related service providing information from the service storing apparatus and providing information necessary for calling the service when the service search inquiry is received from the service requesting apparatus; and
a service providing apparatus for providing service proxy information to provide a service corresponding to service providing information stored in the service storing apparatus and providing a corresponding contents service when a service is called by a service requesting apparatus that receives the proxy information wherein the service requesting apparatus obtains service proxy object information corresponding to the service proxy information from the service relaying apparatus, calls the contents service to the service providing apparatus using the service proxy object information; and
wherein the service requesting apparatus receives property values for registering a service request from a user, generates service request information, and transmits the generated service request information to the service relaying apparatus if service providing information is not in the search result received from the service relaying apparatus.

2. The contents service providing system of claim 1, wherein the service requesting apparatus comprises:
a user inquiry input unit for generating a service search inquiry by receiving a keyword and a category from the user to find a target contents service, inquiring the service relaying apparatus with the generated service search inquiry, and receiving service providing information and service proxy information for receiving service proxy information from the service relaying apparatus;
a service call unit for obtaining service proxy object information from the service relaying apparatus using the service proxy information received by the user inquiry input unit and calling the contents service from the service providing apparatus using the service proxy object information; and
a user interface for receiving a result of a contents service called from the service call unit from the service providing apparatus, and providing the received result to a user.

3. The contents service providing system of claim 2, wherein the user inquiry input unit receives property values for registering a service request from a user, generates service request information, and transmits the generated service request information to the service relaying apparatus if service providing information is not in the search result received from the service relaying apparatus.

4. The contents service providing system of claim 3, wherein the service relaying apparatus registers service request information to the service storing apparatus when the service request information is transmitted from the user inquiry input unit, and transfers corresponding service providing information and service proxy information to the user inquiry input unit when service providing information matched with the service request information is registered.

5. The contents service providing system of claim 4, wherein the service relaying apparatus comprises
   a registration inquiry unit for searching the service storing apparatus using a category and a keyword included in the service search inquiry if the service search inquiry is received from the service requesting apparatus, obtaining corresponding service providing information and service proxy information to the service requesting apparatus; and
   a service proxy container for storing service proxy necessary for calling available contents services generated from the service providing apparatus.

6. The contents service providing system of claim 5, wherein the registration inquiry unit receives interest request information, which a service provider is interested about, from the service providing apparatus, stores the received interest request information in the service providing apparatus, and provides the stored interest request information if the registration inquiry unit receives a service request matched with the stored interest request information.

7. The contents service providing system of claim 5, wherein the service proxy container selectively provide service proxy information and service proxy object information corresponding to the service proxy information to the service requesting apparatus.

8. The contents service providing system of claim 6, wherein the service providing apparatus comprises:
   a service generating unit for generating a source code of a contents service to provide, generating related service providing information and service proxy information, and providing the generated service providing information and the generated service proxy information to the service relaying apparatus;
   a service providing unit for managing a state for providing a contents service based on the generated source code and providing a corresponding contents service;
   a service providing interface for providing corresponding service contents to the service requesting apparatus through a call interface in response to a contents service call from a service requesting apparatus that obtains service proxy information through the service relaying apparatus; and
   a service managing unit for adding, deleting, or modifying the interest request information through the service relaying apparatus, receiving service requesting information matched with interest request information from the service relaying apparatus, and providing the received service requesting information to the service generating unit.

9. The contents service providing system of claim 8, wherein the service managing unit provides a service providing information list with a terminated contents service deleted to the service relaying apparatus if a contents service is terminated.

10. The contents service providing system of claim 8, wherein the service managing unit receives a newly registered service request from the service relaying apparatus and stores the newly registered service request in the service storing apparatus.

11. The contents service providing system of claim 10, wherein the service managing unit transfers the stored service request information to the service generating unit when the service provider wants to provide a contents service in response to the stored service request.

12. The contents service providing system of claim 11, wherein the service generating unit generates a source code for a contents service based on the service request information transferred in response to a service request of the service managing unit and provides the generated source code to the service providing unit.

13. The contents service providing system of claim 8, wherein the service storing apparatus comprises:
   a service providing information table for storing service providing information for contents services provided from the service providing apparatus;
   a service request information table for storing service request information transferred from the service requesting apparatus, which is information about services that a user wants to receive; and
   a service request list information table for storing a list of requests for services interested by a service provider, which is provided from the service providing apparatus.

14. The contents service providing system of claim 1, wherein the service providing information comprises at least one of service provider information which is identification information of a service providing apparatus that provide a corresponding contents service, service target information which is information about a target to receive a corresponding contents service, service category information which is high level classification of a corresponding contents service, service keyword information which is information for searching the service category, service protocol information which is information used to provide a corresponding service, service interface location information for describing a location to obtain information for calling the contents service, and description information which is supplementary information for describing the service.

15. The contents service providing system of claim 3, wherein the service request information comprises at least one of service user information which is an identification value of a service request apparatus that registers a corresponding service request, service category information which is high level classification corresponding to the service request, service keyword information for detail search in the service category, service time limit information for the service request, user contact information which is information of user content related to the service request, request target information which is information about a target to transfer the service request, and description information which is supplementary information for the service request.

16. The contents service providing system of claim 6, wherein the interest request list information comprises at least one of service provider information which is identification information of a service providing apparatus that registers a corresponding interest request, service category information which is information about high level category of a service request interested by the service providing apparatus, service keyword information for detail search in the service category, and auto-deletion time limit information for automatically deleting the interest request.

* * * * *